(No Model.) 2 Sheets—Sheet 1.

A. MILLER.
DEVICE FOR RAISING OR LOWERING THE BOOTS OR DRILLS OF SEEDING MACHINES.

No. 316,808. Patented Apr. 28, 1885.

Attest:
Inventor:
Abraham Miller
per Edson Bros.
Attorneys (No Model.) 2 Sheets—Sheet 2.
A. MILLER.
DEVICE FOR RAISING OR LOWERING THE BOOTS OR DRILLS OF SEEDING MACHINES.
No. 316,808. Patented Apr. 28, 1885.
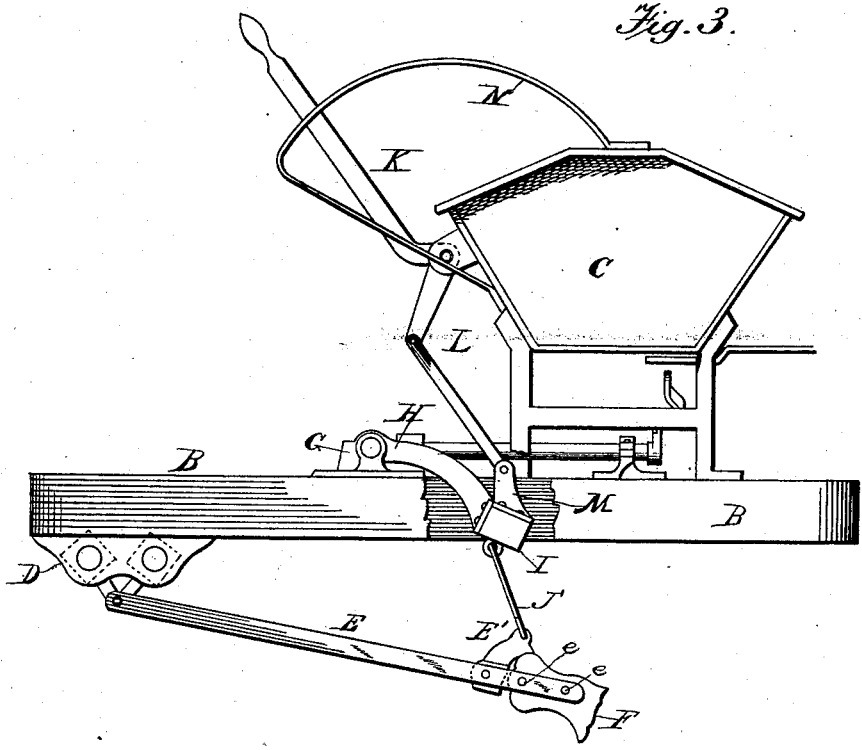
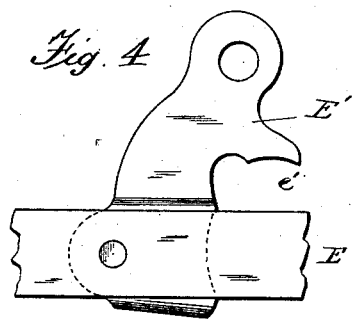
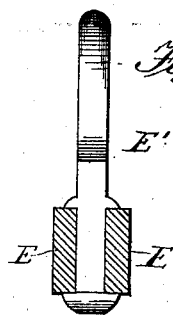

UNITED STATES PATENT OFFICE.

ABRAHAM MILLER, OF NEWARK, ASSIGNOR TO THE NEWARK MACHINE COMPANY, OF COLUMBUS, OHIO.

DEVICE FOR RAISING OR LOWERING THE BOOTS OR DRILLS OF SEEDING-MACHINES.

SPECIFICATION forming part of Letters Patent No. 316,808, dated April 28, 1885.

Application filed August 23, 1884. (No model.)

*To all whom it may concern:*

Be it known that I, ABRAHAM MILLER, a citizen of the United States, residing at Newark, in the county of Licking and State of Ohio, have invented certain new and useful Improvements in Devices for Raising or Lowering the Boots or Drills of Seeding-Machines, of which the following is a specification, reference being had therein to the accompanying drawings, and in which—

Figure 1:
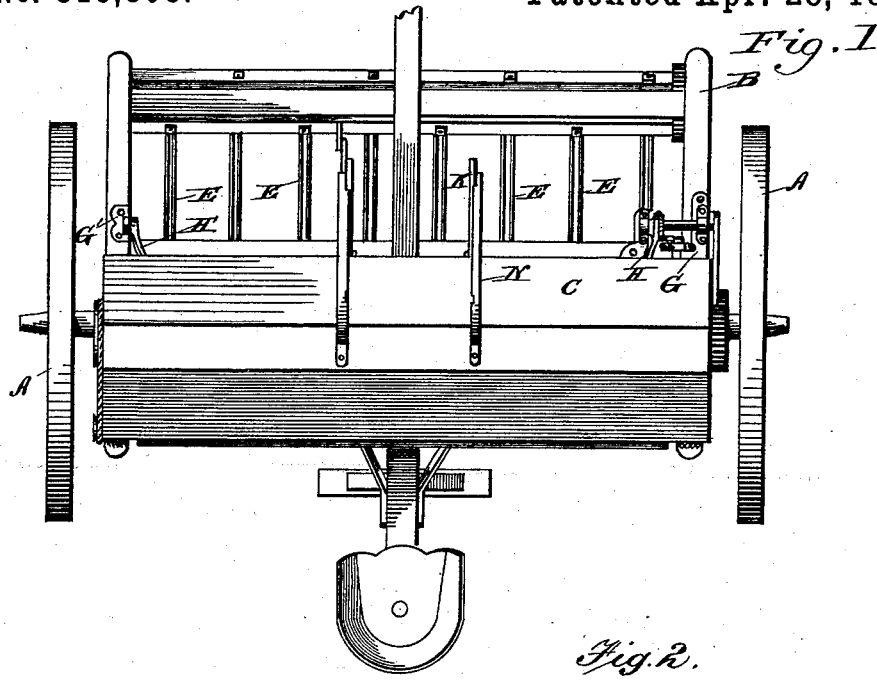
Figure 2:
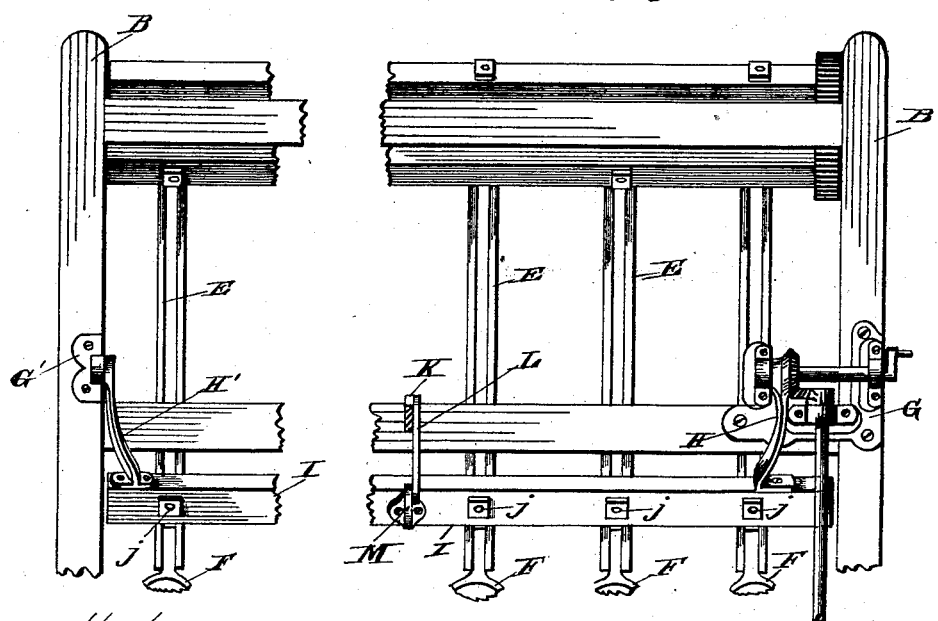

Figure 1 is a plan view of a grain and fertilizer drill embodying my invention. Fig. 2 is an enlarged detail view of parts of the operating mechanism shown in Fig. 1. Fig. 3 represents an enlarged side elevation of a portion of the machine shown in Fig. 1, showing means for operating parts hereinafter described. Figs. 4 and 5 are detached detail views of parts shown in Figs. 2 and 3.

The same letters of reference in the several drawings denote like or corresponding parts.

For the sake of clearness I have given general views of the machine. My description will, however, be limited to the parts constituting or directly connected with my improvement.

A are the wheels; B, the frame mounted thereon; C, the hopper. The brackets D at the front end of the frame, on the under side, are pivotally connected to the drag-bars E, to the rear or lower ends of which are secured the boots F adjustably, as shown, by means of holes and pins e, or otherwise, as preferred.

E' designates castings having the form shown in Figs. 4 and 5, and are inserted between the lower ends of the drag-bars E to separate them and prevent the former from binding upon the ears of the boots, which would be the case were the ends of the drag-bar placed against said ears. Each of the castings E' is provided with a rearwardly-projecting portion, e', against the lower surface of which the ear of the boot impinges when raised to prevent the toes of the boots from falling forward when raised.

Mounted upon the frame forward of the hopper are castings G G', which furnish bearings for the metallic arms H H', which are curved downwardly, as shown, so as to have the greater play. These arms are rigidly secured, one near each end of the bar I, immediately in front of the hopper, which bar is of a length to play freely up and down between the side sills of the frame B, as shown in Fig. 2, and to this bar the drag-bars E are connected by links J, that engage with the castings E', which permit free vertical movement. Near the top of the front face of the hopper C, at the middle of its length, is journaled a lever, K, having a rearwardly-bent handle, as shown, to bring it within the operator's easy reach. The lower arm of said lever is connected to the bar I by means of a link, L, and a forwardly-directed lug, M, formed in a suitable casting, rigidly secured upon said bar at the middle of its length. The lever is caused to engage at any desired point in the notched edge of a curved metallic rack, N, which is secured upon the forward portion of the hopper, as shown, and thus the boots are raised and held up or down at any required height, working or otherwise. The bar and lever, it will be observed, are entirely out of the way when the hoes require cleaning or any other attention, while at the same time the lever is within convenient reaching distance for the operator, whether walking or riding on the seat placed in the rear of the hopper. In this arrangement the operator has his team and drill directly before him, and at the same time the means for raising and lowering the boots are within easy reach, which advantages are absent in those machines in which the levers are at one side and the hoisting-bar in rear of the hopper.

I am aware that a hand-lever has been secured to a crank-shaft in rear of a hopper, said shaft connecting with a transverse bar which is supported upon swinging arms fulcrumed in the main frame in front of the hopper, said bar being connected to a furrow-opener by means of a spring-link, whereby the movement of the hand-lever raises and lowers the transverse bar and increases or decreases the energy of the spring upon the opener; also, that a boot pivoted between two drag-bars and provided with a lug having a break-pin, in combination with a lever, one arm of which is adapted to bear on said lug and the other arm connected to a lifting-lever, is not new, and such devices are not sought to be claimed herein.

Having thus fully described my invention, what I claim, and desire to secure by Letters Patent of the United States, is—

1. The combination of the frame, the hopper, the boots movably connected with the frame, the movable hoisting-bar arranged immediately in front of the hopper, and a lever pivoted to the hopper and connected by a link with the hoisting-bar, substantially as set forth.

2. The combination of the frame, the hopper, the boots movably connected with the frame, a movable hoisting-bar connected with the boots, a lever pivoted to the front of the hopper and connected with the hoisting-bar, and the notched bow or rack secured to the hopper for holding the lever in any desired position, substantially as set forth.

3. The combination of the frame, the hopper, the seat in rear of the hopper, the boots movably connected with the frame, a hoisting-bar connected with the boots and adapted to be moved vertically past the side sills of the main frame, and the lever pivoted in front of the hopper and seat and bent outwardly above its fulcrum, substantially as and for the purpose set forth.

4. The combination of the frame, the curved arms pivoted upon the frame, the hoisting-bar to which said arms are rigidly secured, the boots or hoes, links for connecting said boots with the hoisting-bar, and a bent lever pivoted to the hopper, whereby said hoisting-bar is raised or lowered, substantially as and for the purpose set forth.

5. The combination of the hopper, the open frame, a hoisting-bar adapted to move freely up and down through an opening in said frame immediately in front of the hopper, rigid arms pivotally connecting said bar to the frame, the boots or hoes, links connecting said bar with said hoes, and a bent lever for raising or lowering the hoisting-bar, substantially as set forth.

6. The combination of the drag-bars, the boots, the hoisting-bar, and the links J, with castings interposed between the drag-bars and rigidly secured thereto, substantially as shown and described, and having flanges which embrace the upper and lower edges thereof, substantially as and for the purpose set forth.

7. In a seeder, and in combination with the drag-bars thereof, castings E' e', rigidly secured to and between the drag-bars by means of side flanges made integral with said castings, and bearing upon the upper and lower edges of said bars, and eyes to which the links connecting said castings with the hoisting-bar are attached, substantially as and for the purpose set forth.

In testimony whereof I affix my signature in presence of two witnesses.

ABRAHAM MILLER.

Witnesses:
   CHAS. C. GRASSER,
   GEO. D. GRASSER.